Aug. 9, 1960     H. H. HERRON     2,948,310
LIMBING ATTACHMENT FOR POWER SAWS
Filed March 25, 1958
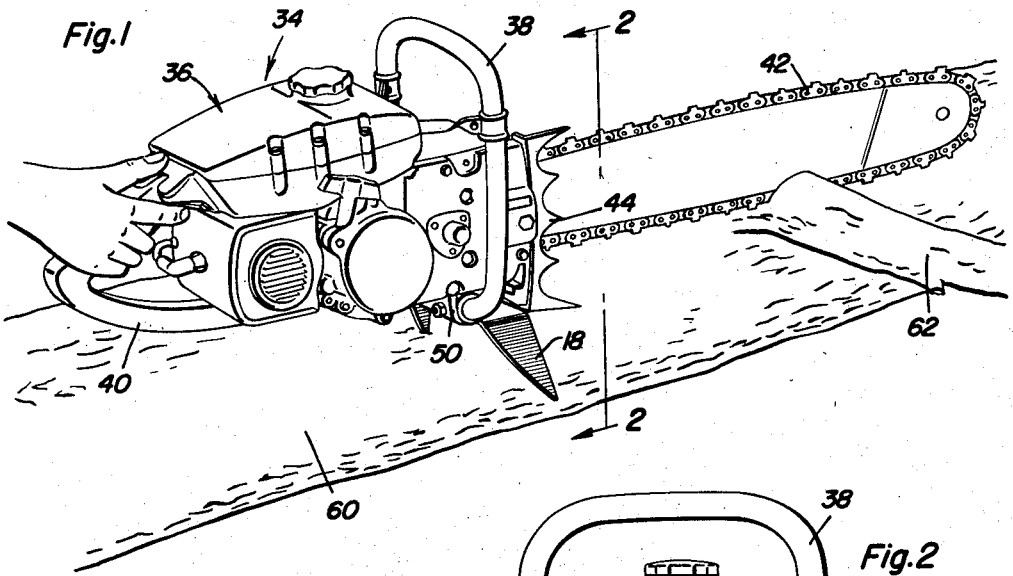
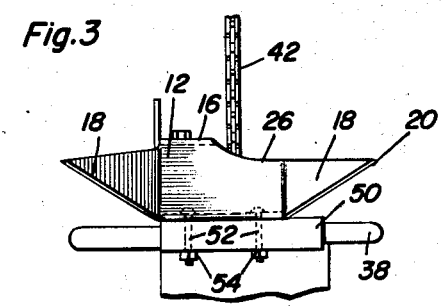
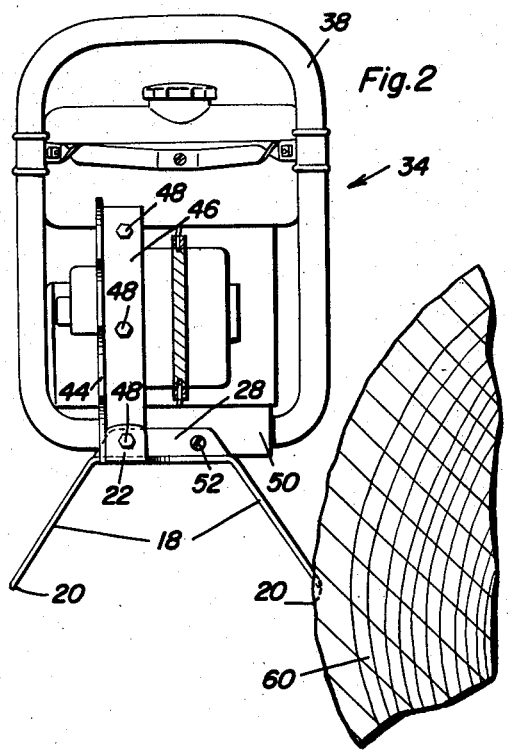
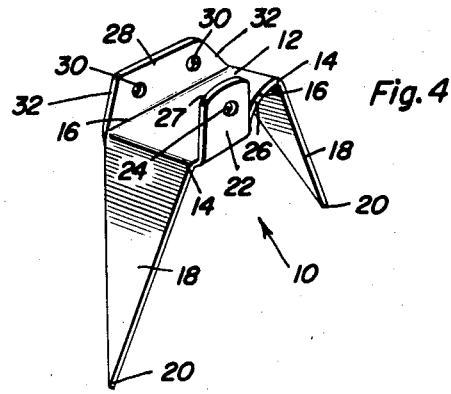
Harrison H. Herron
INVENTOR.

United States Patent Office 2,948,310
Patented Aug. 9, 1960

2,948,310

LIMBING ATTACHMENT FOR POWER SAWS

Harrison H. Herron, Rte. 1, Omak, Wash.

Filed Mar. 25, 1958, Ser. No. 723,905

3 Claims. (Cl. 143—32)

This invention relates generally to attachments for power chain saws, and more particularly to a limbing attachment for these type saws.

The primary object of this invention is to provide an attachment for power chain saws which will aid a workman in the cutting and trimming of trees, since this attachment may be used to fasten the saw to the tree temporarily, so that the tree being trimmed will carry part of the load or weight of the saw, thus relieving a great deal of the burden placed upon a workman.

Another object of this invention is to provide a device of the character described wherein the operator or workman will be relieved from a great deal of strain and effort which he must ordinarily use in order to counteract the tendency of the machine to be pulled about the tree during the sawing operation.

After trees have been felled, it is common practice to trim the tree by removing the various limbs extending therefrom. While it is conventional to provide bucking spikes on the power chain saws so that the saw may be attached to the trunk of a tree during the cutting of the trunk, no practical means has been found, as yet, to provide a spike or attachment which will support the weight of a saw during the trimming or limbing operation. Therefore, a further object of this invention is to provide a spike attachment for power chain saws, which may be engaged in the trunk of a tree, and allow the saw to be positioned so that the limbs extending therefrom may be readily removed.

An even further object of this invention is to provide a device of the character described wherein this attachment is easily connected to conventional type saws, with absolutely no modification of the saw needed in order to fasten the attachment to the saw. In fact, the attachment may be connected to the saw by the same means which holds the bucking spike to the saw and also the forward handle to the saw.

Yet a further object of this invention is to provide a simple and inexpensive device and yet one which is exceedingly effective for the purpose for which it is designed.

This invention contemplates the use of a horizontal plate having downwardly and outwardly depending spikes affixed thereto. The spikes would be connected to the outer ends of the plate, while the sides of the plate have upstanding flanges affixed thereto. These flanges have openings formed therein to which bolts may pass, such as the bolts which hold the forward handle to the saw and the bolts holding the bucking spike to the saw. When the attachment is connected in place, it extends transversely of the saw, so that when one of the spikes is engaged in the trunk of a tree, the saw chain will be extending parallel to the trunk so as to be in position to trim the trees and limbs.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the limbing attachment affixed to a conventional type of power chain saw, illustrating its use in the trimming or limbing operation;

Figure 2 is a front elevational view of the device illustrated in Figure 1, taken upon the reference line 2—2 of Figure 1;

Figure 3 is a bottom view of the device illustrated in Figure 2; and

Figure 4 is a perspective view of the limbing attachment comprising the present invention.

Referring now more specifically to the drawings, the numeral 10 generally designates the attachment comprising the present invention. This attachment is constructed of a horizontal plate 12, having ends 14 and sides 16. Triangular spikes 18 having sharp pointed ends 20 are affixed to plate 12 and depend downwardly therefrom. These spikes 18 also extend outwardly, and it is preferable that the spikes 18 form a 45° angle with the plate 12.

A forward flange 22 is connected to one side 16, and extends upwardly therefrom. This flange has an opening 24 formed horizontally therethrough. It is to be noted that this flange 22 only extends for part of the length of side 16, and the other portion of side 16 which has no flange connected, is curved inwardly as at 26, so as to be better accommodated on the saw. This flange 22 has a rounded upper edge as indicated at 27. Another flange 28 extends upwardly from the other side 16, and this flange extends the full length of the side. This flange too has horizontal openings 30 formed therethrough. The side edges 32 of the flange 28 are inclined upwardly and inwardly. It is to be noted that all of the corners on this attachment are rounded so that the chance of getting hurt on sharp edges or corners is obviated, and a workman need only be careful of the sharp points 20 when using this device.

The numeral 34 generally designates a conventional type of power chain saw, the one illustrated in Figure 1 being the McCulloch model 55. However, most conventional types of chain saws are similarly constructed, with an engine 36, a forward handle 38, a rear handle 40, a saw chain 42, and bucking spikes 44 affixed thereto.

Looking now more particularly at Figure 2, it may be seen that the bucking spikes 44 have attaching flange 46 connected thereto, which has a plurality of bolts 48 which extend through the attaching flange 46 and into the saw proper. The lowermost bolt 48 passes through opening 24 in flange 22, so that attachment 10 may be affixed to the saw. The handle 38 is attached to the saw, by means of a sleeve 50 which is affixed to the saw, and through which the bottom portion of handle 38 extends. Bolts 52 pass through sleeve 50, and through handle 38, and are secured in place by nuts 54. The flange 28 may be connected to sleeve 50, by having the bolts 52 extend through openings 30 therein. Thus, it may be seen that the attachment 10 may be positively locked to the saw without any changes or modifications being made, other than the bolts which are already used in the saw being removed and inserted through openings in the attachment.

In use, the bucking spikes 44 would be engaged into the trunk 60 of a tree and the saw chain 42 may then cut through the trunk. However, usually before this is done, the limbs 62 would be removed. In order to do this, the point 20 of spike 18 would be engaged into the trunk 60 of a tree, with the saw in the position illustrated in Figure 1. Then, the saw chain 42 would be able to saw through the base of limb 62 and remove it from the tree, without the necessity of the workman holding the saw and supporting all of its weight, since the attachment 10 will support a great deal of the weight of the saw, as well as prevent it from turning about the limb 62 which it is sawing.

It may now be seen that there has been described and shown a new and improved type of limbing attachment for saws which will greatly facilitate the trimming and limbing of trees.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power saw comprising an engine, a saw chain operatively connected to said engine, a handle, means mounting said handle to said saw, bucking spikes, means connecting said bucking spikes to said saw forwardly of said handle, a spiked bracket attached to said saw with said bracket extending substantially transversely of the plane of said chain, said bracket including a horizontal plate, spikes depending downwardly and outwardly from either end of said plate, means fastening said plate to said saw, said fastening means including upstanding flanges extending from either side of said plate and having openings formed therethrough for attachment to said saw, one of said flanges being secured to said saw by said handle mounting means, the other of said flanges being secured to said saw by said bucking spikes connecting means.

2. A power saw comprising an engine, a saw chain operatively connected to said engine, a handle, means mounting said handle to said saw, bucking spikes, means connecting said bucking spikes to said saw forwardly of said handle, a spiked bracket attached to said saw with said bracket extending substantially transversely of the plane of said chain, said bracket including a horizontal plate, spikes depending downwardly and outwardly from either end of said plate, means fastening said plate to said saw, said fastening means including upstanding flanges extending from either side of said plate and having openings formed therethrough for attachment to said saw, one of said flanges being secured to said saw by said handle mounting means, the other of said flanges being secured to said saw by said bucking spikes connecting means, said spikes each being triangular in shape.

3. The combination of claim 1 wherein said bracket, flanges and depending spikes are formed integrally.

References Cited in the file of this patent

UNITED STATES PATENTS

| | | |
|---|---|---|
| 2,777,482 | Chamberlain | Jan. 15, 1957 |
| 2,821,213 | York | Jan. 28, 1958 |
| 2,824,586 | Miller | Feb. 25, 1958 |